United States Patent [19]

Jensen

[11] Patent Number: 5,046,144
[45] Date of Patent: Sep. 3, 1991

[54] METHOD AND FURNACE FOR THE PREPARATION OF A MELT FOR MINERAL WOOL PRODUCTION

[75] Inventor: Leif M. Jensen, Roskilde, Denmark

[73] Assignee: Rockwool International A/S, Hedehusene, Denmark

[21] Appl. No.: 257,083

[22] Filed: Oct. 13, 1988

[30] Foreign Application Priority Data

Oct. 15, 1987 [DK] Denmark .............................. 5396/87

[51] Int. Cl.⁵ .............................................. B23K 9/00
[52] U.S. Cl. ............................ 219/121.36; 219/121.51; 219/121.37; 219/121.38; 219/121.59; 373/22; 373/24
[58] Field of Search ........... 219/121.4, 121.43, 121.51, 219/121.36, 75; 315/111.21, 111.51; 373/24, 22, 18, 19

[56] References Cited

U.S. PATENT DOCUMENTS

| | | | |
|---|---|---|---|
| 2,958,161 | 11/1960 | Palmer | 49/77 |
| 3,917,479 | 11/1975 | Sayce et al. | 75/10 |
| 4,361,441 | 11/1982 | Tylko | 219/121.36 |
| 4,396,421 | 8/1983 | Stift et al. | 373/24 |
| 4,740,989 | 4/1988 | Steipe et al. | 373/18 |

FOREIGN PATENT DOCUMENTS

WO8200460 2/1982 PCT Int'l Appl.

Primary Examiner—M. H. Paschall
Attorney, Agent, or Firm—Watson, Cole, Grindle & Watson

[57] ABSTRACT

In a method for the preparation of a melt for the production of mineral wool a raw material is introduced at the top of a shaft furnace and heated to melting temperature partly with a hot gas formed by plasma heating and partly with a hot gas formed by combustion of one or more gaseous hydrocarbons, the latter gas stream being introduced at a level at which the temperature does not exceed 1250° C., and the melt formed is discharged at the bottom of the shaft furnace.

10 Claims, 2 Drawing Sheets

METHOD AND FURNACE FOR THE PREPARATION OF A MELT FOR MINERAL WOOL PRODUCTION

BACKGROUND OF THE INVENTION

This invention relates to a method for the preparation of a melt for mineral wool production wherein a raw material having a composition adjusted to the desired composition of the melt is introduced at the top of a shaft furnace and is heated therein to form a melt which is discharged at the bottom of the furnace.

In a well known method of the above mentioned type the raw material and coke are introduced at the top of the shaft furnace so as to form alternating layers therein, and oxygen-containing gas, such as air, is introduced at the lower part of the furnace so as to effect a combustion of the coke and to heat the raw material to melting temperature. The shaft furnace is preferably a cupola furnace and such a furnace ordinarily comprises four temperature zones, viz. a melt bath, an oxidation zone, a reduction zone and a preheating zone.

The melt bath is located at the lower end of the cupola furnace and the temperature in this zone is typically 1500°-1550° C.

The oxidation zone is located above the melt bath and the lower part of this zone comprises orifices - the so-called tuyeres - for introducing oxygen-containing gas which preferably is preheated.

During the movement of the preheated gas up through the oxidation zone the coke is combusted and the gas temperature is raised from about 500° C. to about 2000° C. The melt formed as a result of the heat generation within the oxidation zone flows downwardly to the melt bath which as mentioned above typically has a temperature of 1500°-1550° C.

The extent of the oxidation zone in the vertical direction is determined by the amount of oxygen supplied to the furnace because the reduction zone starts at the level at which the oxygen supplied through the tuyeres has been used for the combustion of coke.

In the reduction zone in which the temperature is between 1000 and 2000° C. the coke reacts with $CO_2$ formed as a result of the combustion of the coke in the oxidation zone to form CO in an amount which is twice the amount of the consumed $CO_2$ on volume basis.

This reaction is endothermic and causes 20-25% of the energy generated by the combustion within the oxidation zone to be lost as latent heat in the flue gas when the latter contains 6-10% CO. Although this heat can be recovered in an after-combustion step, it is desirable to avoid the formation of CO, i.e. because an after-combustion step requires relatively high initial investments and because the efficiency of such an after-combustion is relatively low.

The reduction, i.e. the formation of CO, is strongly temperature dependent at a temperature of above 1000° C. Thus, the CO formation is increased with a factor of 10 when the temperature is increased from 1000 to 1200° C. On the other hand, the rate at which $CO_2$ is converted into CO is so low at temperatures of below 1000° C. that the reduction within the preheating zone located above the reduction zone and wherein the raw materials introduced at the top of the cupola furnace are heated from the temperature of the surroundings to about 1000° C. is insignificant.

WO82/00460 discloses a method for the preparation of a melt for mineral wool production wherein lumps of a raw material are introduced into a shaft at its upper end, said shaft having a lower end located in a horizontally extending melt furnace which is supplied with hot gas from a mixing chamber.

Gas from a plasma generator, finely divided waste material, carbon powder and optionally hydrocarbon gas are mixed within the mixing chamber before the mixture thus obtained is introduced into the horizontally extending melt furnace. After having given off part of its heat content to melt the raw materials introduced into the furnace, the hot gas passes up through the shaft and is introduced into an after-combustion zone having means for supplying air thereto. The combustion gas formed is cleaned, recycled and is introduced into the mixing chamber together with the components mentioned above.

SUMMARY OF THE INVENTION

The object of the invention is to prepare a melt for mineral wool production in a simple and energy saving manner.

This object and other objects which will appear from the following description are achieved by a method which is characterized in that the raw material introduced into the shaft furnace is heated partly with a hot gas obtained by plasma heating, said gas being introduced into the shaft furnace in the lower part thereof, and partly with a hot gas formed by the combustion of at least one gaseous hydrocarbon, the latter gas being introduced at a level at which the temperature does not exceed 1250° C.

In a prior art method for the preparation of a melt for the production of mineral wool in a cupola furnace in which the heat required for melting the raw materials is generated solely by the combustion of coke. the energy consumption is about 1100 kWh/t of which about 250 kwh/t is the heat consumption resulting from the reaction of coke with $CO_2$ to form CO.

In the method of the invention the reaction of coke with $CO_2$ is avoided partly because the heating of the raw materials is not based on the use of coke as fuel and partly because the gas combustion products are introduced into the furnace at a temperature so low that $CO_2$ does not react with coke. if any, to any substantial degree. Thus, by using the method of the invention the energy consumption can be reduced to about 850 kWh/t.

As mentioned above, the energy used in the method of the invention is derived from electricity and at least one gaseous hydrocarbon, and the ratio of electrical energy to energy generated by combustion of gaseous hydrocarbon is typically from 2:1 to 1:5 and preferably about 1:3.

Since the price of an energy unit generated by combustion of gas is only about one half of the price of an electrical energy unit, the total costs by using the ratio of electrical energy to energy generated by combustion of gas can be reduced by about 45% compared to the production of a melt in a conventional coke-fired cupola furnace.

The use of a combination of plasma heating and heating by combustion of gaseous hydrocarbons presents the additional advantage that the spent gases which are discharged to the atmosphere contain no sulphur and consequently present no environmental problems contrary to flue gases generated by the combustion of coke.

As mentioned above the method of the invention is not based on the combustion of coke. However, it should be mentioned that it may be desirable to introduce small amounts of a carbonaceous material of low reactivity, such as antracit coal, and coke into the furnace. If coke is used the amount is preferably 3–4% by weight (which corresponds to 8–10% by volume) and the coke serves as a support for the raw materials forming the melt.

As is also mentioned above, the gas combustion products are introduced into the shaft furnace in a zone in which the temperature does not exceed 1250° C. in order to avoid the reduction of $CO_2$ to CO with reaction with coke, if any.

In a preferred embodiment of the method of the invention the formation of CO can be almost totally avoided by introducing the combustion gasses in a zone having a temperature not exceeding 1000° C.

The plasma heating is effected by passing a gaseous medium, such as air or nitrogen, through a strong electric field which initially causes the gas molecules to be split into atoms which, following the supply of additional energy, lose their electrons and are converted into positively charged ions. This results in the release of such large amounts of energy that the temperature can be increased to about 5000° C. In practice, the plasma generator used comprises a tubular electrode, ordinarily the anode, which is closed at its rear end and a coaxial tubular water-cooled electrode of opposite polarity, viz. the cathode, consisting of e.g. tungsten or copper. An electric arc is generated between the anode and the cathode by means of a direct current, and by passing gas through the circular space between the two electrodes and out through the front electrode (ordinarily the cathode) the electric arc is drawn out like a highly intensive flame which is directed against the material to be heated.

Plasma heating presents the special advantage that it allows the melting capacity and the amount of melt to be increased within a few minutes without interference with the remaining operational conditions of the furnace.

The combustion of gaseous hydrocarbons can take place within the furnace chamber and in that case a suitable amount of oxygen-containing gas, such as air, is supplied to said chamber.

The combustion may also be effected outside the furnace chamber, e.g. in a separate combustion chamber which communicates with one or more inlets in the furnace wall and which comprises separate conduits for supplying hydrocarbon gas and oxygen-containing gas thereto.

The gaseous hydrocarbon is preferably natural gas and also liquified gas which evaporates in connection with the combustion can be used.

Examples of suitable gaseous hydrocarbons are methane, propane, butane and mixtures thereof, preferably of natural origin.

The invention also relates to a shaft furnace for carrying out the method described above. The shaft furnace of the invention comprises a furnace chamber having means for introducing raw material at the top of the furnace chamber and means for discharging melt from the bottom of said chamber and the shaft furnace is characterized in that it comprises at least one plasma generator located in or adjacent to the lower part of the furnace chamber, preferably above the melt bath, and means for supplying a gaseous hydrocarbon or combustion gasses generated by combustion of at least one gaseous hydrocarbon at a level located above the level of the plasma generator.

Preferably the plasma generator or generators comprise means for introducing solid particles, such as finely divided waste material formed during the production of mineral wool, into the hot stream of gas generated therein.

DESCRIPTION OF PREFERRED EMBODIMENTS OF THE INVENTION

Figure 1:
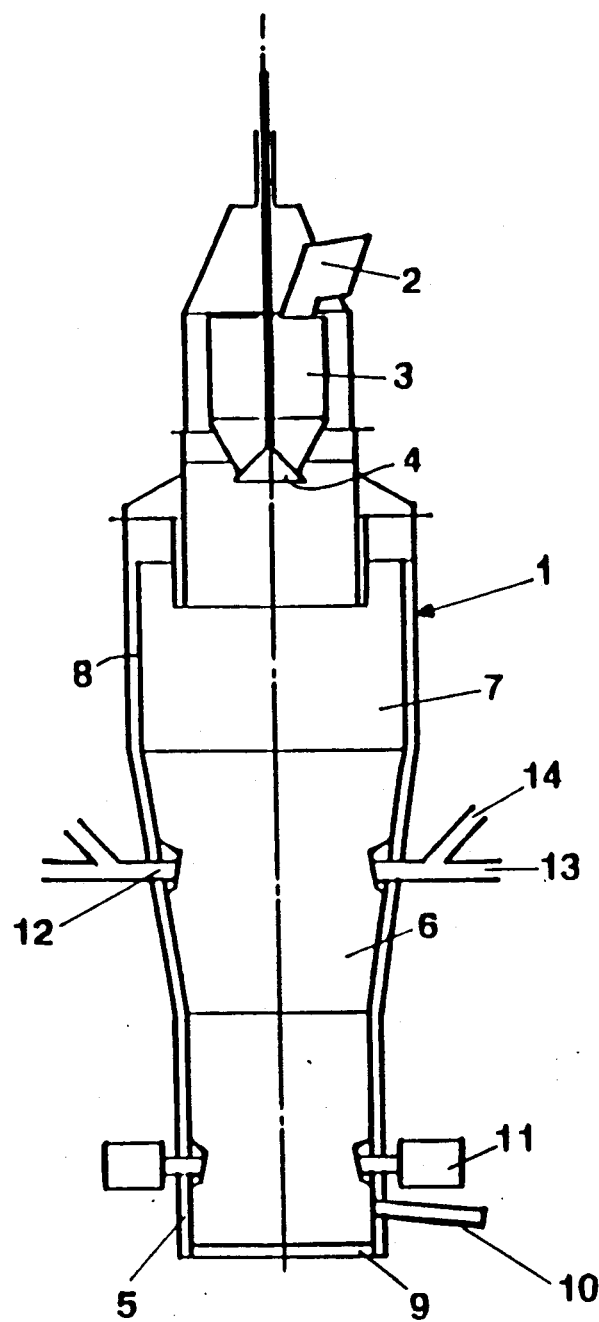
Figure 2:
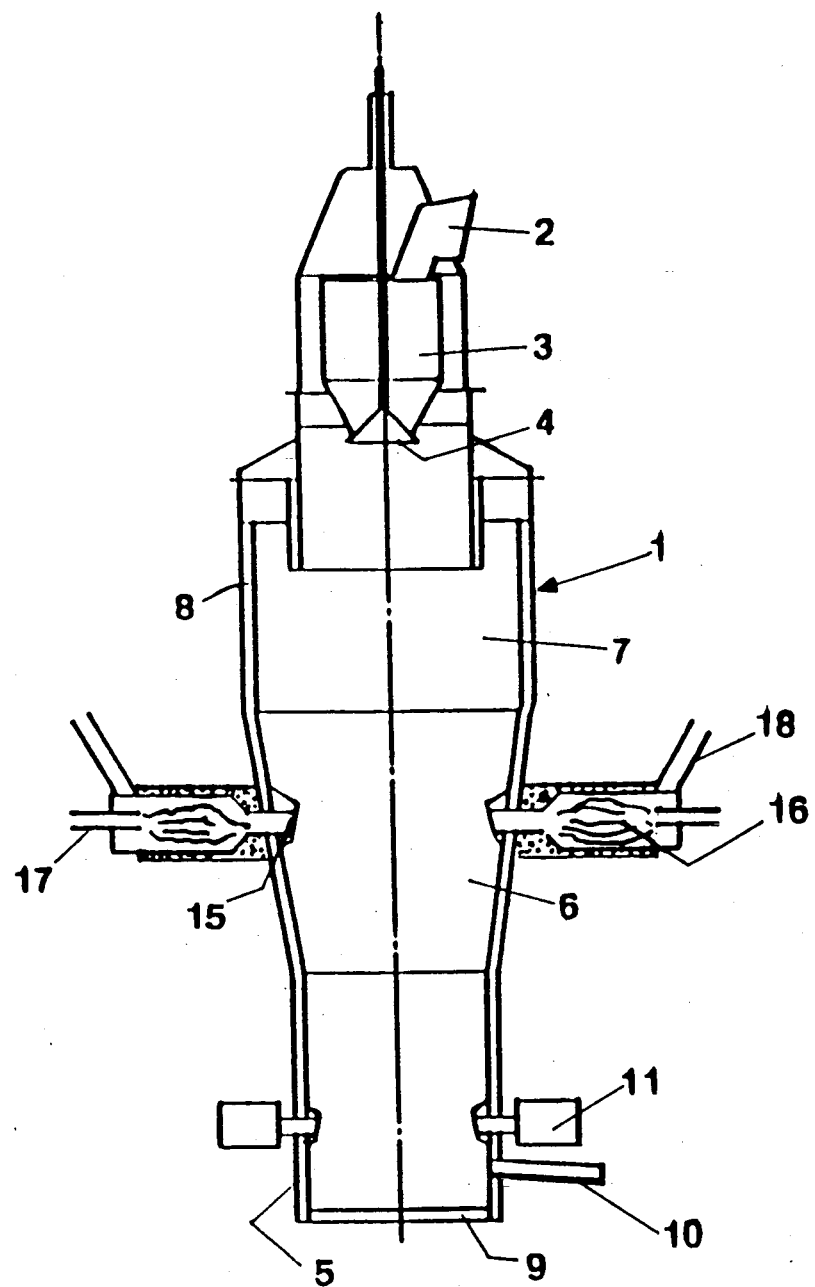

The invention will now be described in further detail with reference to the drawings in which FIG. 1 and FIG. 2 show schematic sectional views of two embodiments of a shaft furnace of the invention.

FIG. 1 shows a cupola furnace 1 having a feed hopper 2 which communicates with a charge container 3 with an axially displaceable cone 4 forming the bottom of said container. The furnace chamber of the cupola furnace 1 consists of a lower cylindrical part 5, a central conical part 6 and an upper cylindrical part 7, and all three parts are surrounded by a water-cooled jacket 8. The cupola furnace 1 has a plane bottom 9, and a melt discharge pipe 10 is located a suitable distance above the bottom 9. A suitable number of plasma generators 11 are mounted in the furnace wall a short distance above the melt discharge pipe 10.

A number of gas burners 12 are provided in the furnace wall in the conical part 6 of the furnace chamber, and a hydrocarbon gas and an oxygen-containing gas can be supplied to the furnace chamber through pipes 13 and 14, respectively.

The furnace shown in FIG. 2 is essentially identical to that of FIG. 1 except that the gas burners have another design and are located differently.

The conical part 6 of the furnace of FIG. 2 comprises a number of pipes 15 for introducing combustion gasses generated by gas burners 16 located outside the furnace chamber. Each gas burner 16 comprises a chamber connected with a pipe 17 for the supply of hydrocarbon gas and a pipe 18 for the supply of oxygen-containing gas.

The furnaces illustrated are operated in the following manner: The raw material which is to form the desired mineral melt and optionally small amounts of carbonaceous material of low reactivity are introduced into the furnace chamber through the feed hopper 2 and the charge container 3, the dosing being effected by suitably adjusting the position of the cone 4.

The upper part 7 of the furnace chamber acts as a preheating zone wherein the material introduced therein is heated by the ascending gasses. The material descends from the preheating zone and into the conical part 5 of the furnace chamber in which it is further heated by the combustion gasses generated by the gas burners 12 (FIG. 1) or 16 (FIG. 3). The temperature within the conical part 6 of the furnace chamber does not exceed 1250° C. and preferably does not exceed 1000° C. in order to reduce or totally prevent that $CO_2$ formed in the furnace reacts with carbon, if any, to form CO.

The melting of the material introduced into the furnace chamber takes place within the lower part thereof by means of the heat generated by the plasma generators.

The melt formed descends towards the bottom 9 of the furnace and the melt is discharged through the melt discharge pipe 10.

I claim:

1. A method for the preparation of a melt for mineral wool production in a shaft furnace having an inlet for raw material at the top of the furnace and an outlet for discharging melt at the bottom thereof, comprising plasma heating a gas to form a high temperature gas and introducing said high temperature gas into a zone of the shaft furnace which is located adjacent to the bottom of the shaft furnace to melt material located in said zone and to preheat material located above said zone, generating a stream of hot gas by combustion of at least one gaseous hydrocarbon and introducing said stream of hot gas into the shaft furnace through at least one gas inlet located above the melting zone and at a level at which the temperature does not exceed 1250° C.

2. A method according to claim 1, characterized in the gas formed by the combustion is introduced at a level at which the temperature does not exceed 1000° C.

3. A method according to claim 2, characterized in that the ratio of energy generated by plasma heating to energy generated by combustion of gaseous hydrocarbon is from 2:1 to 1:5.

4. A method according to claim 1, characterized in that the ratio of energy generated by plasma heating to energy generated by combustion of gaseous hydrocarbon is from 2:1 to 1:5.

5. A method according to claim 1, characterized in that hot gas formed by plasma heating is generated by one or more plasma generators.

6. A method according to claim 1, characterized in the hot gas formed by combustion of gaseous hydrocarbon is generated in the shaft furnace.

7. A method according to claim 6, characterized in that the gaseous hydrocarbon consists of methane, propane, butane or mixtures thereof.

8. A method according to claim 7, characterized in that gaseous hydrocarbon used is a natural gas.

9. A shaft furnace for the preparation of a melt for mineral wool production comprising a furnace chamber having an inlet for raw material at the top of the furnace and an outlet for discharging melt at the bottom of the furnace, at least one plasma generator located in or adjacent to the lower part of the furnace chamber for melting material located in a zone adjacent to the bottom of the furnace and to preheat material located above the zone, and means for supplying gaseous hydrocarbon or combustion gasses formed by combustion of at least one hydrocarbon through at least one gas inlet located above the melting zone and at a level located above the level of the plasma generator.

10. A shaft furnace according to claim 9, characterized in the plasma generator comprises means for introducing solid particles into a hot stream of gas generated therein.

* * * * *